(12) United States Patent
Pottier et al.

(10) Patent No.: US 12,147,566 B2
(45) Date of Patent: Nov. 19, 2024

(54) CONTROLLING PERSONAL INFORMATION

(71) Applicant: Arm Limited, Cambridge (GB)

(72) Inventors: Remy Pottier, Grenoble (FR); Minsheng Lu, Cambridge (GB); Arthur Michael Goldberg, Parkland, FL (US); Christopher Daniel Emmons, Austin, TX (US)

(73) Assignee: Arm Limited, Cambridge (GB)

( * ) Notice: Subject to any disclaimer, the term of this patent is extended or adjusted under 35 U.S.C. 154(b) by 340 days.

(21) Appl. No.: 17/683,681

(22) Filed: Mar. 1, 2022

(65) Prior Publication Data
US 2023/0281336 A1 Sep. 7, 2023

(51) Int. Cl.
*G06F 15/16* (2006.01)
*G06F 21/62* (2013.01)

(52) U.S. Cl.
CPC ...... *G06F 21/6245* (2013.01); *G06F 21/6254* (2013.01); *G06F 2221/2141* (2013.01)

(58) Field of Classification Search
CPC ............. G06F 21/6245; G06F 21/6254; G06F 2221/2141
See application file for complete search history.

(56) References Cited

U.S. PATENT DOCUMENTS

| | | | | |
|---|---|---|---|---|
| 10,528,838 B1* | 1/2020 | Carter, Jr. | ........... | G06F 21/6245 |
| 10,771,247 B2* | 9/2020 | Luce | ................... | G06F 21/6254 |
| 11,250,007 B1* | 2/2022 | Harris | ................... | G06F 16/148 |
| 11,288,107 B2* | 3/2022 | Sharifi | ................ | G06F 21/6254 |
| 11,528,256 B1* | 12/2022 | Wojcik | ................ | G06F 21/6254 |
| 11,704,431 B2* | 7/2023 | Kraus | ................. | G06F 21/6245 726/26 |
| 2011/0321137 A1* | 12/2011 | Iida | ....................... | G06F 21/6245 726/4 |
| 2016/0012248 A1* | 1/2016 | Inoue | .................. | G06F 21/6245 726/4 |
| 2016/0098577 A1* | 4/2016 | Lacey | ................. | G06F 21/6245 726/28 |
| 2017/0140160 A1* | 5/2017 | Arasan | ................ | G06F 21/6227 |
| 2017/0140174 A1* | 5/2017 | Lacey | ................. | G06F 21/6245 |
| 2021/0089667 A1* | 3/2021 | Kadiyala | ............ | G06F 21/6245 |
| 2021/0097083 A1* | 4/2021 | Harris | ................. | G06F 21/6218 |
| 2021/0182423 A1* | 6/2021 | Padmanabhan | ..... | G06F 21/6245 |

(Continued)

*Primary Examiner* — Richard G Keehn
(74) *Attorney, Agent, or Firm* — NIXON & VANDERHYE P.C.

(57) ABSTRACT

Provided is a digital/analog signal processing apparatus and method for controlling exposure of personally identifiable information to be transferred from storage in a secure enclave, comprising a memory and an integrated circuit coupled to the memory, configured to: select a data set stored in the storage; individuate personally identifiable information in the data set; determine an individual person's subset of personally identifiable information; extract an identifier for the individual person from the subset; interrogate stored data using the identifier to locate metadata comprising permission to expose the individual person's subset; and responsive to a failure to locate the metadata comprising permission, either: emit a signal seeking the permission; or apply a protective measure to the individual person's subset of individuated personally identifiable information prior to transfer of the data set in a digital/analog signal outside the secure enclave.

17 Claims, 2 Drawing Sheets

(56) References Cited

U.S. PATENT DOCUMENTS

Figure 1:
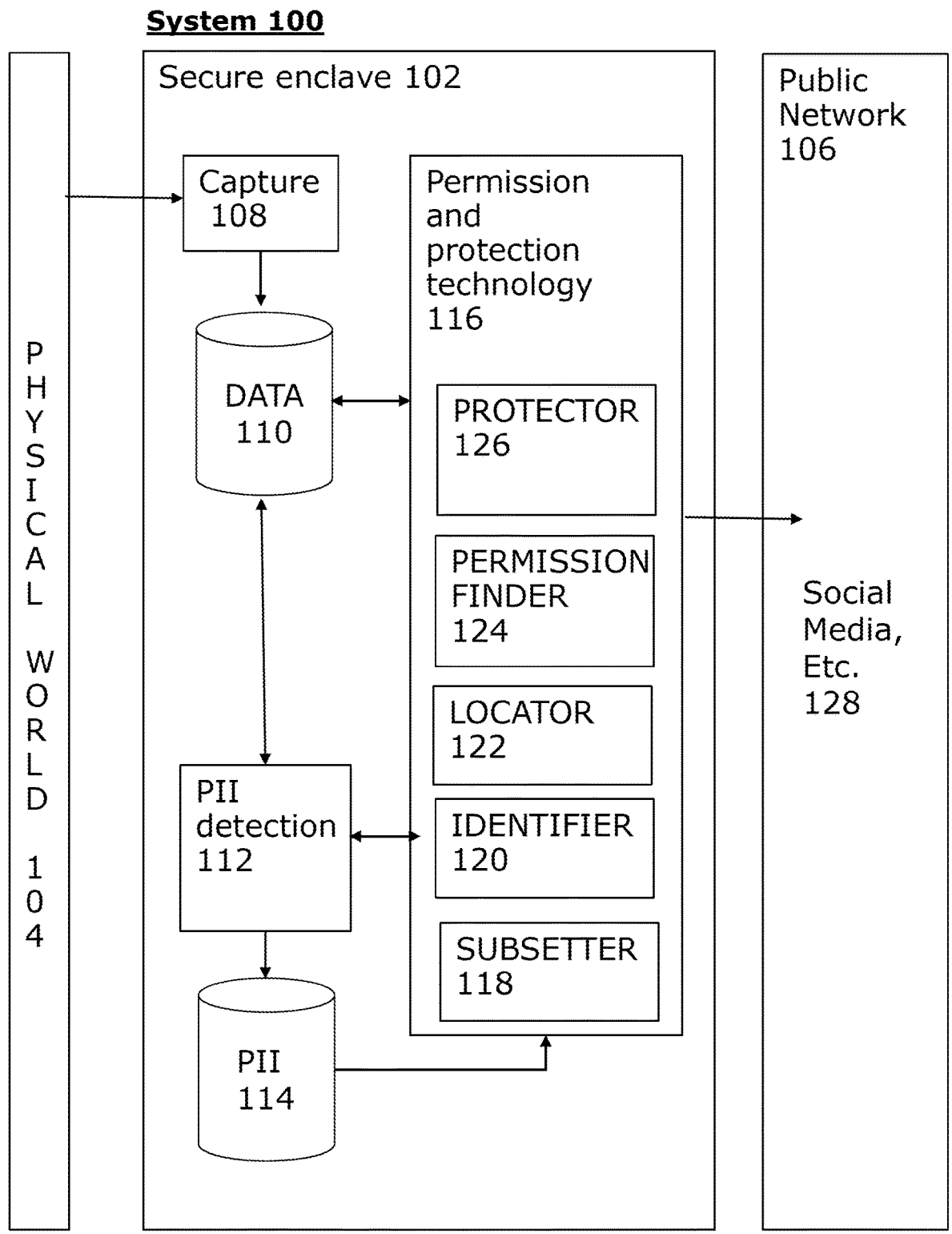

| | | | |
|---|---|---|---|
| 2021/0232673 A1* | 7/2021 | Athlur | G06F 21/6245 |
| 2021/0264053 A1* | 8/2021 | Shortell | G06F 21/6245 |
| 2022/0020456 A1* | 1/2022 | Ahmed | G06F 21/6245 |
| 2022/0255966 A1* | 8/2022 | Sienicki | G06F 21/105 |
| 2023/0039068 A1* | 2/2023 | Majdabadi | G06F 21/6272 |
| 2023/0153402 A1* | 5/2023 | Poosarla | G06F 21/6245 |
| | | | 713/176 |
| 2023/0206329 A1* | 6/2023 | Cella | G06F 21/6245 |

\* cited by examiner

CONTROLLING PERSONAL INFORMATION

The present technology is directed to an apparatus and technique to enable a digital/analog signal system for processing captured data that is to be transferred outside a secure enclave without compromising the privacy of any personally-identifiable information (PII) that has been captured. PII may comprise, among other things, image data showing faces or other identifiable features, voice data that might be recognized by a hearer, life, employment, and movement history, and medical history data from which an individual might be identified. Such information being closely associated with a natural person having, in some jurisdictions, legal rights and in most, moral rights over personal information, it is desirable for those capturing, processing and potentially revealing such information to have a care as to the sensitivity with which the information must, or at least should, be handled.

The digital/analog signal processing system may be provided in the form of dedicated hardware or in the form of firmware or software, typically at a low level in the system stack (or of a combination of hardware and low-level code), to address the difficulties of secure handling of personally-identifiable and sensitive information. In this way, the technique is made available as a computing infrastructure to support any relevant signal processing applications that capture personally-identifiable information and then have the potential to expose that information outside the secure enclave where the original capture has occurred. A secure enclave, in this context, means the private memory and processor of the original capturer of the data set that may contain PII.

In a first approach to difficulties arising from the need to control sensitive or personal information there is provided a digital/analog signal processing apparatus for controlling exposure of personally identifiable information to be transferred from storage in a secure enclave, comprising a memory and an integrated circuit couple to the memory, configured to select a data set stored in the storage; individuate personally identifiable information in the data set; determine an individual person's subset of individuated personally identifiable information; extract an identifier for the individual person from the individual person's subset of individuated personally identifiable information; interrogate stored data using the identifier to locate metadata comprising permission to expose the individual person's subset of individuated personally identifiable information; and responsive to a failure of the interrogating to locate the metadata comprising permission, either: emit a signal seeking the permission or apply a protective measure to the individual person's subset of individuated personally identifiable information prior to transfer of the data set in a digital/analog signal outside the secure enclave.

In a second approach there is provided a digital/analog signal processing method for controlling exposure of personally identifiable information to be transferred from storage in a secure enclave, comprising selecting a data set stored in the storage; individuating personally identifiable information in the data set; determining an individual person's subset of individuated personally identifiable information; extracting an identifier for the individual person from the individual person's subset of individuated personally identifiable information; interrogating stored data using the identifier to locate metadata comprising permission to expose the individual person's subset of individuated personally identifiable information; and responsive to a failure of the interrogating to locate the metadata comprising permission, either: emitting a signal seeking the permission; or applying a protective measure to the individual person's subset of individuated personally identifiable information prior to transfer of the data set in a digital/analog signal outside the secure enclave.

In the hardware implementation, there may be provided electronic apparatus comprising memory elements and logic elements (such as integrated circuitry) operable to implement the methods of the present technology. In another approach, the method may be realised in the form of a computer program product, stored on a non-transitory computer-readable medium, operable to cause a computer system to function according to the present technology.

Figure 2:
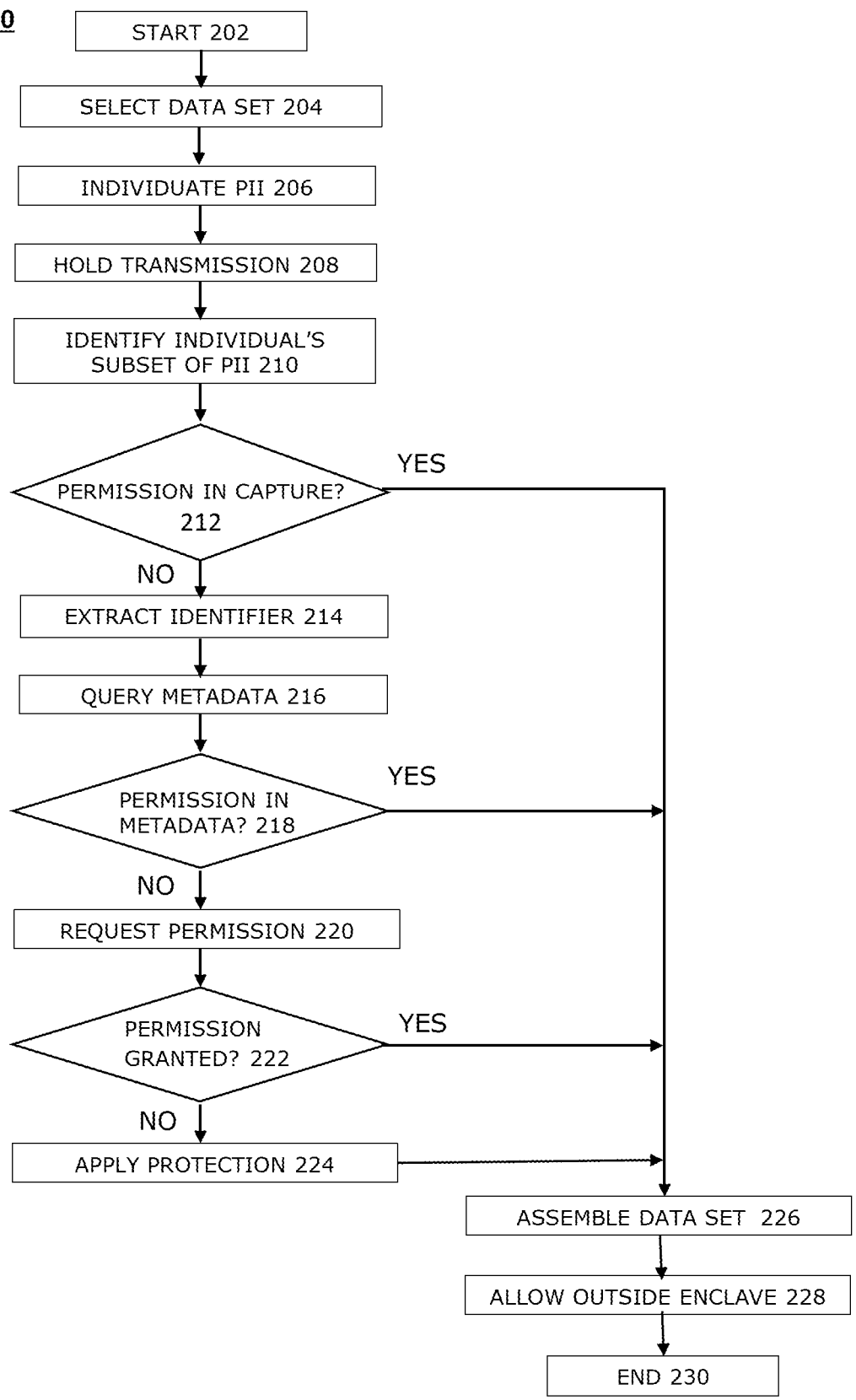

Implementations of the disclosed technology will now be described, by way of example only, with reference to the accompanying drawings, in which:

FIG. 1 shows a simplified example of a system comprising a digital/analog signal processing apparatus in relation to the physical world and a public network; and FIG. 2 shows one example of a method of operation of a digital/analog signal processor having components, such as integrated circuit logic components according to an instance of the present technology.

The environment within which the present technology is operable is one in which a processing system may capture data from the physical world. Such a processing system may be embedded in, for example, a camera or other recording apparatus, or it may comprise a combination of local apparatus and a private cloud service for handling data captured by the local apparatus. It may, indeed, comprise sets of connected devices, each handling part of the job of capturing and processing data and constructing signal means for transferring the data across network connections to devices or apparatus that may be at least intermittently in electronic communication with one another. Typically, however, the technology may be at least partially embedded in a handheld device, such as a smartphone with a camera and sound recording apparatus, a local memory or data storage and some form of processing facility, usually comprising an integrated circuit with data processing functionality. In a further possible setting, the technology may be at least partially embedded in a static system, such as a system of fixed cameras used to monitor an area, a sound capture system for intrusion detection, or the like. In a yet further setting, the technology may be at least partially embedded in an segmented reality apparatus. In all these example cases, the technology may be partially embedded and partially operable in a remote, but electronically-coupled system, such as a cloud processor, a remote server, or in a distributed system, such as a distributed processing network in the form of a mesh network or the like.

In the interconnected world in which information captured by devices, such as the cameras and sound recorders embedded in common appliances such as smartphones and in-home smart appliances, is commonly transferred into outputs, such as social media sites, a difficulty arises when that information relates to natural persons who may not wish their personally-identifiable information to be exposed to the public in the context in which it appears, or at all. Many such natural persons may be merely bystanders or passers-by, who have no relationship with the owner of the capturing device. In many jurisdictions, rules are in place to protect the interests of those whose personally-identifiable information may be captured. At the same time, there are few solutions in place to enable those who capture such information to use it only in compliance with those rules and with the rights of the persons affected. In most instances, it is necessary for a user to scan the information, such as image files or sound files, to identify PII and then to acquire permission from the persons affected, or to apply deletion or obscuration technology to avoid publishing PII materials against the wishes of the subjects.

To achieve the goal of preventing exposure of PII, the broadest and crudest possible technique might be considered to be some form of "jamming," whereby a person's own device disables devices within a specified range from recording or transferring any data. This would prevent undesirable exposure of PII, but would have many undesirable side effects. A second possibility, for preventing exposure of PII comprising location information, would be a similar jamming technique, but applied within a specific location. For example, a nightclub might implement a geofenced jamming technology to create a privacy-restricted area within which no PII (such as images) could be captured, or possibly within which no transfer of data from in-range devices could be accomplished. Such techniques are already in use in for preventing phone use in privacy-sensitive areas, such as locker rooms. These techniques are unavoidably broad and might be seen as draconian in other locations and circumstances, and so it may be desirable to achieve a goal of controlling exposure of PII in a more sensitive and granular fashion. It would, for example, be desirable to offer subjects the opportunity to personally decide which PII could be transferred from a secure enclave into a public arena, and under what specific circumstances such a transfer may take place.

A system constructed according to an implementation of the present technology will typically need to offer an opportunity for any possible subject who may have PII potentially exposed to make a positive decision to permit PII to be transferred outside a secure enclave and into a public arena. Thus, a default of any such system should be that subjects are not shown, or at least, not shown in an identifiable manner, unless they have opted-in. Of course, such an opt-in may be accomplished in many ways—for example, those attending an event may be offered an opportunity to agree to appear in images from the event that are published on a website describing the event. Those who have not provided positive opt-in agreement at the time of publication would be assumed not to have granted permission, and the present technology would then interpose and prevent the exposure of the PII.

The present technology offers a system and method to assist those who capture personally-identifiable information to use it only in compliance with those rules and with the rights of the persons affected. The system and method are provided as an infrastructure interposed between the initial capture of information from the physical world and its potential exposure in publicly-accessible form, typically over public networks using social media applications. The system and method, in their various implementations, may use machine learning for several purposes, including at least: first, to individuate PII in the captured data set by distinguishing the PII from the mere background information in the data set; second, to determine that a subset of PII forms a subset that is individually attributable to a "named" person; third, to determine which of the attributed subsets likely represents a bystander or passer-by incidentally captured in a data set whose intended subject is another person or entity. Use of machine learning in at least these contexts renders the present technology highly-suitable for implementation as an infrastructure available for use by various applications, including, but not limited to, image processing, sound processing, natural language processing, augmented reality, and social media applications.

FIG. 1 shows a simplified example of a system 100 comprising a digital/analog signal processing apparatus having a secure enclave 102 at least intermittently coupled with some form of public or insecure network 106, such as the Internet. The public network 106 provides platforms enabling wide publication of information, such as images, using various social media sites 128. In a typical sequence of events, a user operates a capture component 108, such as a camera or an audio recording device, to capture some data 110 from the physical world 104. The captured data 110 is stored, at least temporarily inside secure enclave 102. The storage may take the form of any of the data storage means now known, or later developed, such as solid state storage, magnetic medium storage, or the like. The data, while it remains within secure enclave 102, is not subject to any of the controls and limitations placed upon data use (for example, personally-identifiable information) by the various jurisdictional entities—for example, national governments and supranational organisations. Such controls and limitations typically become active when it is contemplated to expose the data, for example, via a public network 106, outside the secure enclave 102. To provide the infrastructure for compliance with such controls, the system 100 interposes permission and protection technology 116 within secure enclave 102 between physical world 104 and public network 106. After data has been captured by capture component 108 from physical world 104, permission and protection technology 116 activates PII (personally-identifiable information) detector 112 to extract, typically using machine-learning methods, PII data 114 from data 110. For example, in an image data set, PII detection 112 may be operable to individuate facial data or the like from the total image data. In a video data set, PII detection 112 may be operable to individuate gait data or voice from a sequence of video frames. The term "individuation" is used here to describe the action of recognising and distinguishing those elements of a data set that form separable entities, for example, faces in image data sets, or voices in sound files. In a concrete example, the technique of recognising and placing of a box round an individual's face in an image data set to distinguish that face data from the surroundings is an act of individuation. In the present technology, such individuated data may constitute personally-identifiable information, the control of which may be subject to constraints as described above. Once individuated, the PII 114 is managed by the permission and protection technology as follows. A subsetter component 118 is operable to separate individually-identifiable subsets of PII, thus, for example, in a group photographic image, dividing off the individual face data for each separate individual person represented. In the case of voice data, the individual voice streams of utterances are separated out. Identifier 120 is then then activated to interrogate all the available data 110 and PII 114 to find or assign individual identifiers to each of the separable entities, such as faces or voices. In some cases involving face data, for example, there may already exist a tag in the image file metadata naming (or in some other fashion searchably identifying) an individual whose face is represented. In other cases, image or sound recognition may be used to associate the captured and individuated data with an identifier. A locator component 122 may then be used to search through data storage or to interrogate coupled systems to locate metadata associated with the identifier. In one alternative, where real-time activity is being captured for transfer (for example, in some forms of augmented reality system), persons who may have their data captured incidentally (as bystanders or passers-by) may have in operation a continuous metadata signalling device, operated using, for example, a short-range radio signal to grant or deny permission to transfer PII. Such a system may operate in a blanket manner, by transmitting a continuous opt-out signal, or it may be set up to transmit an "ask me first" signal allowing for explicit permission to be granted on a case-by-case basis. This variant may operate in addition to, and potentially overriding, any "permanent" locally or remotely stored metadata.

If locator component 122, when activated, finds no metadata associated with the identifier in local data storage, permission finder 124 is operable to widen the search, and may, for example, issue requests to other entities to determine whether the subject has granted permission to publish the PII. In one concrete example, a captured image contains an individuated face which is identified, and no metadata is located in local storage to indicate that permission to publish has been granted by the subject. In this example, permission finder 124 is activated, but further fails to elicit explicit permission for the PII to be published. Protector component 126 is then operable to determine a course of action that protects the PII appropriately. For example, the entire image may be blocked from being transferred outside the secure enclave, or it may be modified to remove or obscure the PII before transfer. For compliance with any legal requirements or personal needs of subjects, the default action in all cases of doubt (where it is not clear that the subject would be willing to permit transfer of PII outside the secure enclave) is to apply the highest level of protection to the PII.

The permission and protection technology 102 may be extended to incorporate rules-based reasoning engines for the application of specific individual rules in particular cases. For example, employees of a company might not wish to have their images appear on social media pages advertising a competitor's products, and might thus set up a permission rule in metadata to prevent this from happening. A politician might wish not to be shown in an image which also contains banners or emblems representing or commending an opposing party. A person might be content to have an image published on social media that shows the person engaged in a healthy pursuit, but not content to have an image published that shows the person apparently engaged in a less healthy pursuit, such as drinking what may appear to be alcoholic beverages.

As will be clear to one of ordinary skill in the art, these are merely examples of rules that might be enforced by means of rules engines. The rules may also be used to specify the nature of any obscuration required—in one example tasking an image data set as the subject PII, a person may stipulate that the entirety of the PII is to be deleted from the file with a "blackout" colour wash, substituted with a generated background fill, or pixelated/soft focussed while retaining an overall outline. In another example, where the PII comprises voice data, a person may stipulate that the entire subset voice stream is to be deleted from the data set to be published, or that it may be obscured using a transform, such as voice recoding, to make the voice unidentifiable as that of an individual person.

FIG. 2 shows one example of a method of operation 200 of a digital/analog signal processor according to an instance of the present technology. It is to be noted that throughout the process, the default setting is an opt-out—that is, it is presumed until proved otherwise that no permission is granted to transfer any PII outside the original capturing secure enclave. Thus, any permission metadata must take the form of a positive opt-in to be effective.

The method 200 starts at START 202, and at 204 a data set that has been captured at the digital/analog signal processor is selected for processing. This selection may simply be directed to a real-time capture, but it may equally be a selection from a plurality of pre-existing data sets containing data captured earlier. The data set is examined at 206 to individuate any PII (effectively isolating PII from background data by applying a bounding technique) that may be included in the data set. In the case of a real-time capture and transfer system, such as is provided in many augmented reality systems, the present technology introduces at 208 a temporary hold on transfer or transmission of the data set until the permission position for any PII is clarified. At 210, the or each individual's subset of the PII is identified—for example, in a voice application, a single individuals' contribution to the recorded utterances is "chunked" together as a PII subset. In the case of an image file, each identified individual set of face data forms a PII subset, and it, and any associated metadata are held in some form of working storage for processing.

If at 212, it is determined that the metadata associated with a captured, individuated PII subset itself comprises metadata indicating that permission is granted to transfer the PII outside the secure enclave, the data set for transmission outside the secure enclave begins to be assembled at 226 by adding the permitted subset PII. The assembly process at 226 cannot complete until all PII has been processed, either with permission having been obtained, or with appropriate protection having been applied, and with any relevant rules having been applied. As described above, it is possible that metadata accompanying captured data may have been passed to the capturer by means of a short range radio signal or the like, in which case the permission process completes at 212 for that PII.

If, at 212, it is determined that no permission has accompanied the PII data at its capture, the data set is examined at 214 to extract an identifier for the or each of the PII subsets. Once a subset has been given an identifier, which takes the form of a searchable entity, the process can continue by determining whether or not there exists any indication of permission for the PII to be transferred or transmitted outside the original secure enclave where the data was captured. At 216, metadata associated with the data set or stored in local storage is queried to determine whether any permission metadata exists for the specified individual's PII subset. For example, in local storage there may be a directory of friends and associates who have granted permission for PII, such as images, to be transferred outside the secure enclave, for example onto a social media website. By the same token, there may be a stored directory of those who have positively communicated an opt-out decision, even though opt-out is the default setting. If at 218 the query at 216 results in a finding that permission exists in the metadata at 218, the permitted subset PII is added to the assembled data set at 226. The assembly process at 226 cannot complete until all PII has been processed, either with permission having been obtained, or with appropriate protection having been applied, and with any relevant rules having been applied.

If the test at 218 returns the result that no permission has been found in the metadata, at 220 a request for permission is more widely sent. The request for permission may take the form of a signal sent locally via a short-range wireless apparatus, a request sent to a local network, or a request sent to a wide area network, such as the Internet. The request for permission may take the form of a database query, a synchronous or transactional computing request-response interaction, or it may take the form of an asynchronous queued message transmission. The request for permission may take the form of a directed message addressed to a single entity (such as a device known to be associated with a person whose permission is sought), or it may take the form of a broadcast message addressed to multiple addressees, whereby the permission request may be made to a plurality of, or all those persons whose permission is sought for publication of a particular PII-containing data set. The broadcast message may be transmitted directly from the device having the secure enclave by which the data set was originally captured, or, providing that no details of the PII are potentially exposed thereby, it may be sent via a remotely-coupled system—for example, the capture device may initiate the sending of a suitably structured and worded request from a social media application hosted on a remote server, where the recipient of the request is known to be a member of that social media platform.

If permission is granted at 220, the test at 222 returns a positive response indicating that permission has been granted, and the relevant subset PII is added to the assembled data set at 226. The assembly process at 226 cannot complete until all PII has been processed, either with permission having been obtained, or with appropriate protection having been applied, and with any relevant rules having been applied.

If permission is not granted at 220, the test at 222 returns a negative response, indicating that permission has not been granted to transfer the subset of PII outside the secure enclave. At 224, the process of applying protective measures commences. In an image data example, the applying of protective measures may take the form of deletion of the entirety of the subset image PII from the file with a "black-out" colour wash, substitution with a generated background fill, or pixelation/soft focussing while retaining an overall outline. In another example, where the PII comprises voice data, a person may stipulate that the entire subset voice stream is to be deleted from the data set to be published, or that it may be obscured using a transform, such as voice recoding, to make the voice unidentifiable as that of an individual person.

At 226, as described above, a data set comprising any processed subset PII is assembled according to the outcome of the permission and protection technology described above. First, the default setting of opt-out is applied for all subset PII for which no permission has been found in the captured data, stored metadata, or by way of positively granted permission in a response to a request for permission. This subset PII is completely scrubbed from the resulting transferable data set. Second, any rules governing subset PII that can be transferred in an obscured form are applied, and the subset PII is added in its obscured form to the transferable data set. Last, any subset PII for which a positive opt-in has been found or obtained is added to the transferable data set. If necessary, final scans may be performed to ensure that no unprocessed PII remains in the material that now constitutes the transferable data set. The assembling of the transferable data set is completed at the conclusion of sub-process 226, and at 228, the transferable data set is permitted to be transferred from the secure enclave to the public arena, which may comprise any of the publicly-available social media sites and the like as described above. The method of operation of a digital/analog signal processor according to an instance of the present technology completes at END 230.

As will be immediately clear to one of skill in the digital/analog signal processing art, the technology described above may comprise a number of different implementations, with additions and variations.

For example, the means for determining an individual person's subset of individuated personally identifiable information may comprise means for distinguishing between an intended subject of said data set and an incidentally included individual person using a machine learning technique, and selecting the incidentally included individual person's individuated personally identifiable information for further processing.

The distinguishing between an intended subject of the data set and an incidentally included individual person using a machine learning technique may comprise distinguishing based on one or more of relative data size, relative volume of speech, centrality of image data, % coverage in data set, posing indicators, orientation in image, or point of focus of image. Of course, as will be understood by one of skill in the art, this list of criteria is not exhaustive, and many additional variations may be applied by such a machine learning technique.

The digital/analog signal processing apparatus according to the present technology may comprise rules governing any permission to transfer PII outside the secure enclave, and the rules may comprise extracting contextual data relating to the individuated personally identifiable information from the data set and applying the rules according to the contextual data.

In a digital/analog signal processing apparatus according to the present technology, applying a protective measure may comprise deleting the individual person's subset of individuated personally identifiable information, disguising the individual person's subset of individuated personally identifiable information, or the like. In the case of disguising, the disguising may comprise visually obfuscating image data, recoding sound data, de-localising location data, and the like.

In a digital/analog signal processing apparatus according to the present technology, it is important from the viewpoint of those persons affected by the technology that in the metadata that comprises an opt-in/opt-out indicator of the permission, opt-out is maintained as the default setting of the indicator, and only a positive opt-in may be takes as granting permission to transfer any subset of PII outside the secure enclave. As described above, one option is for the opt-in/opt-out indicator to be obtained from a broadcast (such as a short-range wireless transmission) by an external device at a capture time of the data set. In the case of a digital/analog signal processing apparatus according to the technology coupled with or in electronic communication with a real-time streaming system, a temporary upload hold needs to be applied to perform the interrogation of the metadata to determine permission prior to transfer of the data set in a digital/analog signal outside the secure enclave.

As will be appreciated by one skilled in the art, the present techniques may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments. In hardware embodiments, the signal processor may comprise a memory and hardware logic in the form of one or more integrated circuits configured to process data sets captured by one or more devices, such as cameras, sound recording devices, wearable devices or smart home devices.

Furthermore, the present technique may take the form of a computer program product tangibly embodied in a non-transitory computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for conducting operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C++, a scripting language, such as Python, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). Program code for conducting operations of the present techniques may also use library functions from a machine-learning library, such as TensorFlow.

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a hardware descriptor language (such as Verilog™ or VHDL) which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause the computer system or network to perform all the steps of the method.

In a further alternative, an embodiment of the present technique may be realized in the form of a data carrier having functional data thereon, the functional data comprising functional computer data structures to, when loaded into a computer system or network and operated upon thereby, enable the computer system to perform all the steps of the method.

It will be clear to one skilled in the art that many improvements and modifications can be made to the foregoing exemplary embodiments without departing from the scope of the present disclosure.

The invention claimed is:

1. A digital/analog signal processing apparatus for controlling exposure of personally identifiable information to be transferred from storage in a secure enclave, comprising:
   a memory; and
   an integrated circuit coupled to said memory, configured to:
   select a data set stored in said storage;
   individuate personally identifiable information in said data set;
   determine an individual person's subset of individuated personally identifiable information;
   extract an identifier for said individual person from said individual person's subset of individuated personally identifiable information;
   interrogate stored data using said identifier to locate metadata comprising permission to expose said individual person's subset of individuated personally identifiable information; and
   responsive to a failure of said interrogating to locate said metadata comprising permission, either:
      emit a signal seeking said permission; or
      apply a protective measure to said individual person's subset of individuated personally identifiable information prior to transfer of said data set in a digital/analog signal outside said secure enclave;
   wherein said determining an individual person's subset of individuated personally identifiable information further comprises:
      distinguishing between an intended subject of said data set and an incidentally included individual person using a machine learning technique; and
      selecting said incidentally included individual person's individuated personally identifiable information for further processing.

2. The digital/analog signal processing apparatus according to claim 1, said metadata comprising rules governing said permission; and further comprising: extracting contextual data relating to said individuated personally identifiable information from said data set; and applying said rules according to the contextual data.

3. The digital/analog signal processing apparatus according to claim 1, said applying a protective measure comprising one of deleting said individual person's subset of individuated personally identifiable information or disguising said individual person's subset of individuated personally identifiable information.

4. The digital/analog signal processing apparatus according to claim 3, said disguising comprising one of visually obfuscating image data, recoding sound data or de-localising location data.

5. The digital/analog signal processing apparatus according to claim 1, said distinguishing between an intended subject of said data set and an incidentally included individual person using a machine learning technique comprising distinguishing based on one or more of relative data size, relative volume of speech, centrality of image data, % coverage in data set, posing indicators, orientation in image, or point of focus of image.

6. The digital/analog signal processing apparatus according to claim 1, said metadata comprising an opt-in/opt-out indicator of said permission; and wherein opt-out is a default setting of said indicator.

7. The digital/analog signal processing apparatus according to claim 6, wherein said opt-in/opt-out indicator is obtained from a broadcast by an external device at a capture time of said data set.

8. The digital/analog signal processing apparatus according to claim 1, wherein, in a real-time streaming system, a temporary upload hold is applied to perform said interrogating said metadata to determine permission prior to transfer of said data set in a digital/analog signal outside said secure enclave.

9. A computer-implemented digital/analog signal processing method for controlling exposure of personally identifiable information to be transferred from storage in a secure enclave, comprising:
    selecting a data set stored in said storage;
    individuating personally identifiable information in said data set;
    determining an individual person's subset of individuated personally identifiable information;
    extracting an identifier for said individual person from said individual person's subset of individuated personally identifiable information;
    interrogating stored data using said identifier to locate metadata comprising permission to expose said individual person's subset of individuated personally identifiable information; and
    responsive to a failure of said interrogating to locate said metadata comprising permission, either:
        emitting a signal seeking said permission; or
        applying a protective measure to said individual person's subset of individuated personally identifiable information prior to transfer of said data set in a digital/analog signal outside said secure enclave;
    wherein said determining an individual person's subset of individuated personally identifiable information further comprises:
        distinguishing between an intended subject of said data set and an incidentally included individual person using a machine learning technique; and
        selecting said incidentally included individual person's individuated personally identifiable information for further processing.

10. The computer-implemented digital/analog signal processing method according to claim 9, said metadata comprising rules governing said permission; and further comprising: extracting contextual data relating to said individuated personally identifiable information from said data set; and applying said rules according to the contextual data.

11. The computer-implemented digital/analog signal processing method according to claim 9, said applying a protective measure comprising one of deleting said individual person's subset of individuated personally identifiable information or disguising said individual person's subset of individuated personally identifiable information.

12. The computer-implemented digital/analog signal processing method according to claim 11, said disguising comprising one of visually obfuscating image data, recoding sound data or de-localising location data.

13. The computer-implemented digital/analog signal processing method according to claim 9, said distinguishing between an intended subject of said data set and an incidentally included individual person using a machine learning technique comprising distinguishing based on one or more of relative data size, relative volume of speech, centrality of image data, % coverage in data set, posing indicators, orientation in image, or point of focus of image.

14. The computer-implemented digital/analog signal processing method according to claim 9, said metadata comprising an opt-in/opt-out indicator of said permission; and wherein opt-out is a default setting of said indicator.

15. The computer-implemented digital/analog signal processing method according to claim 14, wherein said opt-in/opt-out indicator is obtained from a broadcast by an external device at a capture time of said data set.

16. The computer-implemented digital/analog signal processing method according to claim 9, wherein, in a real-time streaming system, a temporary upload hold is applied to perform said interrogating said metadata to determine permission prior to transfer of said data set in a digital/analog signal outside said secure enclave.

17. A non-transitory computer readable medium storing computer program code to, when loaded into a computer system an executed thereon, cause said computer system to perform a digital/analog signal processing method for controlling exposure of personally identifiable information to be transferred from storage in a secure enclave, comprising:
    selecting a data set stored in said storage;
    individuating personally identifiable information in said data set;
    determining an individual person's subset of individuated personally identifiable information;
    extracting an identifier for said individual person from said individual person's subset of individuated personally identifiable information;
    interrogating stored data using said identifier to locate metadata comprising permission to expose said individual person's subset of individuated personally identifiable information; and
    responsive to a failure of said interrogating to locate said metadata comprising permission, either:
        emitting a signal seeking said permission; or
        applying a protective measure to said individual person's subset of individuated personally identifiable information prior to transfer of said data set in a digital/analog signal outside said secure enclave;
    wherein said determining an individual person's subset of individuated personally identifiable information further comprises:
        distinguishing between an intended subject of said data set and an incidentally included individual person using a machine learning technique; and
        selecting said incidentally included individual person's individuated personally identifiable information for further processing.

\* \* \* \* \*